United States Patent
Malischewski et al.

(10) Patent No.: US 9,897,026 B2
(45) Date of Patent: Feb. 20, 2018

(54) IN-ENGINE HEATING MODE BY INCREASING LOAD

(71) Applicant: MAN TRUCK & BUS AG, München (DE)

(72) Inventors: Thomas Malischewski, Heilsbronn (DE); Dominik Renner, Ansbach (DE)

(73) Assignee: MAN Truck & Bus AG, Munich (DE)

( * ) Notice: Subject to any disclaimer, the term of this patent is extended or adjusted under 35 U.S.C. 154(b) by 0 days.

(21) Appl. No.: 15/199,289

(22) Filed: Jun. 30, 2016

(65) Prior Publication Data

US 2017/0002757 A1    Jan. 5, 2017

(30) Foreign Application Priority Data

Jul. 4, 2015    (DE) .................. 10 2015 008 722

(51) Int. Cl.

| | |
|---|---|
| *F01N 3/00* | (2006.01) |
| *F02D 41/02* | (2006.01) |
| *F02D 41/00* | (2006.01) |
| *F01D 17/02* | (2006.01) |
| *F02D 13/04* | (2006.01) |
| *F02D 13/06* | (2006.01) |

(Continued)

(52) U.S. Cl.
CPC ......... *F02D 41/0245* (2013.01); *F01D 17/02* (2013.01); *F01N 3/021* (2013.01); *F01N 3/103* (2013.01); *F01N 9/00* (2013.01); *F02B 37/00* (2013.01); *F02D 13/04* (2013.01); *F02D 13/06* (2013.01); *F02D 41/0087* (2013.01); *F02D 41/064* (2013.01); *F01N 3/2066* (2013.01); *F01N 2430/02* (2013.01); *F01N 2900/1404* (2013.01); *F02D 41/0255* (2013.01); *Y02T 10/144* (2013.01); *Y02T 10/26* (2013.01); *Y02T 10/47* (2013.01)

(58) Field of Classification Search
USPC ....... 60/274, 277, 284, 285, 286; 123/198 F, 123/443, 481, 90.15, 90.16, 90.17, 90.18, 123/90.23
See application file for complete search history.

(56) References Cited

U.S. PATENT DOCUMENTS

| | | | |
|---|---|---|---|
| 6,418,720 B1 | 7/2002 | Cornell et al. | |
| 6,938,410 B2 * | 9/2005 | Glugla .................. | F01N 3/2006 123/198 F |

(Continued)

FOREIGN PATENT DOCUMENTS

| | | |
|---|---|---|
| DE | 3723703 | 1/1989 |
| DE | 10348107 | 5/2005 |
| DE | 102013019183 | 5/2015 |

OTHER PUBLICATIONS

Oct. 13, 2016 which issued in the corresponding European Patent Application No. 16001277.9.

*Primary Examiner* — Binh Q Tran
(74) *Attorney, Agent, or Firm* — Cozen O'Connor

(57) ABSTRACT

An operating method for a device that has an internal combustion engine having a crankshaft and a plurality of cylinders and an exhaust gas aftertreatment system. The operating method is distinguished, in particular, by the fact that fuel injection into at least one of the cylinders is shut down when required and the at least one shut-down cylinder is put into a braking mode, with the result that the temperature of the exhaust gas for the exhaust gas aftertreatment system can be increased.

14 Claims, 3 Drawing Sheets

(51) Int. Cl.
*F01N 3/021* (2006.01)
*F01N 3/10* (2006.01)
*F02D 41/06* (2006.01)
*F02B 37/00* (2006.01)
*F01N 9/00* (2006.01)
*F01N 3/20* (2006.01)

(56) References Cited

U.S. PATENT DOCUMENTS

| | | | |
|---|---|---|---|
| 7,073,322 B2 * | 7/2006 | Sumilla | F02D 41/0082 123/443 |
| 7,164,391 B2 * | 1/2007 | Lin | H01Q 1/125 343/880 |
| 7,614,216 B2 * | 11/2009 | Yamashita | F02D 17/02 60/284 |
| 2004/0255576 A1 * | 12/2004 | Brown | F02D 17/02 60/285 |
| 2011/0283688 A1 * | 11/2011 | Yuda | F01N 3/101 60/300 |
| 2014/0034010 A1 | 2/2014 | Serrano et al. | |

* cited by examiner

IN-ENGINE HEATING MODE BY INCREASING LOAD

BACKGROUND OF THE INVENTION

1. Field of the Invention

The invention relates to an operating method for a device that has an internal combustion engine having a crankshaft and a plurality of cylinders and an exhaust gas aftertreatment system. The device preferably serves for use in a motor vehicle, preferably a commercial vehicle, in particular a heavy goods vehicle or bus.

2. Description of the Related Art

Chemical processes in exhaust gas aftertreatment systems are generally active only above a certain temperature level. If the load profile of the use of the internal combustion engine does not enable sufficient exhaust gas enthalpy/temperature to be made available to achieve or maintain this temperature level, measures must be taken in the internal combustion engine to increase the exhaust gas temperature.

SUMMARY OF THE INVENTION

It is an object of one aspect of the invention to provide an operating method by which the temperature level of the exhaust gas for an exhaust gas aftertreatment system can be increased more quickly and/or more effectively, in particular even at low loads of the internal combustion engine.

This object can be achieved by means of the features of the main claim. Advantageous developments of the invention can be taken from the dependent claims and the following description of preferred embodiments of the invention.

The invention provides an operating method for a device that has an internal combustion engine (e.g. spark-ignition engine, gas engine, diesel engine, etc.) having a crankshaft and a plurality of cylinders and an exhaust gas aftertreatment system for the expedient aftertreatment of exhaust gas from the internal combustion engine and/or the cylinders.

The operating method is distinguished, in particular, by the fact that fuel injection into at least one of the cylinders is shut down (e.g. deactivated, prevented, suspended, etc.) when required and the at least one shut-down cylinder, i.e. the at least one cylinder with shut-down (e.g. deactivated, prevented, suspended, etc.) fuel injection, is put (e.g. switched etc.) into a braking mode (e.g. decompression mode and/or mode with negative work), by a braking cam, with the result that the temperature of the exhaust gas for the exhaust gas aftertreatment system is thereby expediently increased.

For a given load profile of the internal combustion engine, it is in principle only possible to achieve an increase in the temperature of the exhaust gas (exhaust gas temperature level) for the exhaust gas aftertreatment system by reducing the efficiency of the internal combustion engine.

The cylinder-selective shutdown of fuel injection in accordance with one aspect of the invention makes it possible selectively to have at least one cylinder perform negative work (that is to say expediently losses), which has to be compensated by at least one cylinder that is still firing. The power loss that can be obtained can be intensified by switching over the cam contour in a cylinder-selective way, in particular on the outlet side, for example. A different cam contour can make the at least one shut-down cylinder perform decompression work (work according to the decompression principle) or put it into a braking mode and allow the exhaust gas for the exhaust gas aftertreatment system to escape from the cylinder during an expansion stroke.

The higher load demand of the at least one firing cylinder results in a sharp increase in exhaust gas temperature. The air mass flow through the system constituted by the engine is thus essentially not reduced, which can advantageously make an additional large contribution to the exhaust gas enthalpy/exhaust gas temperature increase, contrasting, for example, with "throttled" heating modes.

Owing to the fact that at least one cylinder is put into a braking mode, an increased mean pressure and thus an increase in the temperature of the exhaust gas for the exhaust gas aftertreatment system is advantageously obtained in the at least one remaining cylinder.

It is possible for the demanded crankshaft torque to be produced (e.g. processed) by at least one firing cylinder.

It is possible for the at least one cylinder, which has been put into the braking mode, to perform or produce negative work (that is to say, in particular, a braking activity and/or losses) and for the negative work to be compensated by at least one firing cylinder.

It follows from this that the work of the at least one firing cylinder that has to produce the demanded crankshaft torque rises, and therefore the temperature of the exhaust gas also rises as a result.

The operating method expediently represents an in-engine heating mode (within the internal combustion engine) for exhaust gas for the exhaust gas aftertreatment system.

It is possible for control of the temperature of the exhaust gas for the exhaust gas aftertreatment system to be accomplished by shutting down the at least one cylinder and/or by putting the at least one shut-down cylinder into a braking mode.

It is possible for shutting down fuel injection into at least one of the cylinders and/or putting the at least one shut-down cylinder into a braking mode to be accomplished by a cam contour device. The cam contour device can have one or more cams, which can be arranged on the same shaft or separate shafts.

The device furthermore preferably comprises an exhaust turbocharger, e.g. one having a turbine and a compressor.

The exhaust gas aftertreatment system preferably comprises at least one diesel oxidation catalyst, one SCR catalyst (SCR: selective catalytic reduction) and/or one diesel particulate filter.

It is possible for the temperature of the exhaust gas for the exhaust gas aftertreatment system, preferably downstream of a turbine of a turbocharger, to be increased in comparison with a normal mode, expediently in the in-engine heating mode in accordance with the invention, in particular under the same boundary conditions, e.g. at the same speed and with the same load demand.

It should be mentioned that, in the context of one aspect of the invention, fuel is injected and preferably converted in a firing cylinder, with the result that the associated piston, in particular, performs crankshaft work. In the case of a non-firing cylinder, fuel injection is deactivated and/or no fuel injection takes place, with the result that the associated piston, in particular, produces losses and/or performs substantially no crankshaft work.

It should furthermore be mentioned that shutting down fuel injection into at least one of the cylinders and putting the at least one shut-down cylinder into a braking mode can take place substantially simultaneously or at least partially in succession (shutting down of fuel injection at an earlier time than putting into braking mode or vice versa).

In particular, the operating method according to one aspect of the invention is suitable for achieving what is expediently as high a temperature as possible of the exhaust gas for the exhaust gas aftertreatment system at low loads of the internal combustion engine and/or low demanded crankshaft torques. For this purpose, fuel injection into at least one of the cylinders is shut down, and the at least one shut-down cylinder is put into a braking mode, resulting in an increased mean pressure and thus an increased exhaust gas temperature in the at least one remaining cylinder.

The invention is not restricted to an operating method but also includes a motor vehicle, preferably a commercial vehicle, e.g. a heavy goods vehicle or a bus, having a control system designed to perform the operating method as disclosed herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

The above-described preferred embodiments and features of the invention can be combined with one another. Other advantageous developments of the invention are disclosed in the dependent claims or will become apparent from the following description of preferred embodiments of the invention in conjunction with the attached figures.

DETAILED DESCRIPTION OF THE PRESENTLY PREFERRED EMBODIMENTS

Figure 1:
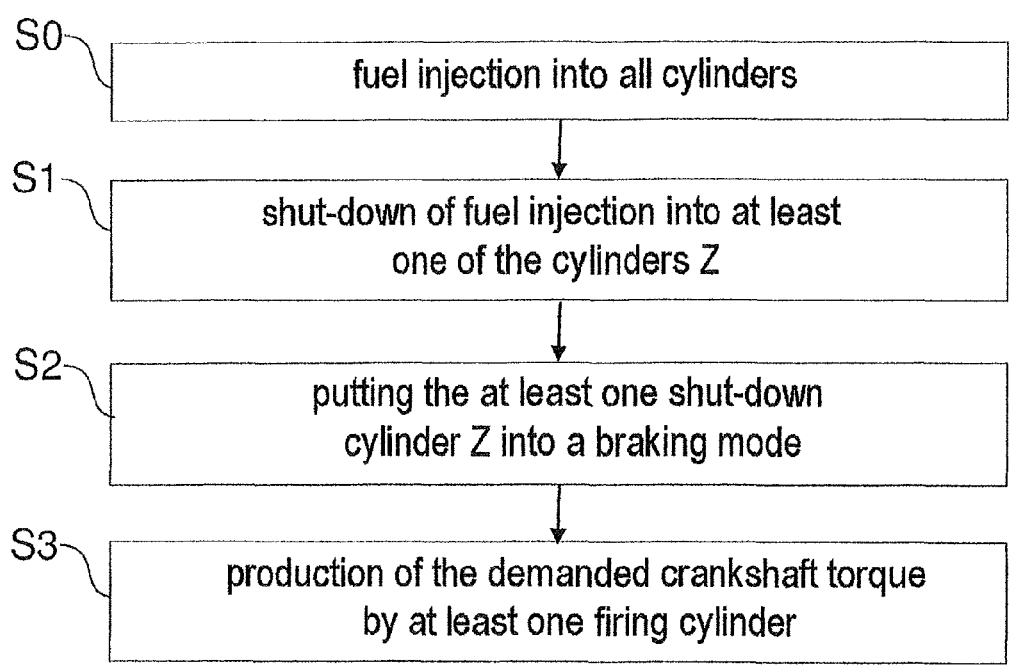
FIG. 1 is a flow diagram of an operating method according to one embodiment of the Invention.

FIG. 1 shows a flow diagram of an operating method according to one embodiment of the invention.

The operating method is expediently used in a device for a motor vehicle that has an internal combustion engine having a crankshaft and a plurality of cylinders, an exhaust gas aftertreatment system for aftertreating exhaust gas from the internal combustion engine or the cylinders, and an exhaust turbocharger.

With reference to FIG. 1, starting from a step S0 for example, in which all the cylinders are preferably firing (fuel injection and conversion), fuel injection into at least one of the cylinders Z can be shut down in a step S1 when required, and the at least one shut-down cylinder Z is put into a braking mode in a step S2. Steps S1 and S2 can be implemented by a cam contour device. Thus, by a cam contour switch in accordance with the "Audi Valve Lift System" known from the prior art, for example, it is possible to switch from a normal exhaust cam contour to the exhaust cam contour described, for example, in DE 10 2013 019 183 A1, which corresponds to the valve lifts described and shown in DE 10 2013 019 183 A1. As described in DE 10 2013 019 183 A1, it is possible in this way to raise the braking power of certain cylinders and the exhaust gas temperature.

Thus, the operating method can employ the principle described in DE 10 2013 019 183 A1. In order to increase the power loss of shut-down cylinders, the engine braking cam described in DE 10 2013 019 183 A1 can be used. The cam contour makes it possible to increase the braking power of the cylinders, expediently by decompression of the exhaust stroke.

As an alternative or in addition, the operating method can likewise employ the principle of the "Audi Valve Lift System". The "Audi Valve Lift System" serves, in particular, to change a cam contour during the operation of the engine, thus making it possible to choose between different cam contours.

By switching the cam contour, e.g. in accordance with the "Audi Valve Lift System", it is possible to change from a normal exhaust cam contour to the exhaust cam contour described in DE 10 2013 019 183 A1, which corresponds to the valve lifts described and shown in DE 10 2013 019 183 A1 with the result that the braking power of non-firing cylinders, i.e. cylinders without fuel injection, is increased, as described in DE 10 2013 019 183 A1. Owing to the deterioration in the overall efficiency of the engine, the exhaust gas temperature increases accordingly.

In a step S3, the demanded crankshaft torque is produced by at least one firing cylinder, in particular in addition to the losses or negative work of the at least one shut-down cylinder Z, which is in a braking mode.

Steps S1, S2 and S3 have the effect that the temperature of the exhaust gas from the internal combustion engine or the cylinder or cylinders for the exhaust gas aftertreatment system is increased. The work demanded from the at least one firing cylinder and the temperature of the exhaust gas rise. It is possible to choose the sequence of steps S1 and S2 and/or S3 in an expedient way within the scope of the invention. Steps S1, S2 and S3 can take place at least partially in succession and/or at least partially substantially simultaneously, for example.

Example: load demand or demanded crankshaft torque: 800 Nm at 1200 rpm; 6-cylinder engine.

In normal mode, each of the 6 cylinders must convert or burn 90 mg of fuel per work cycle, for example. If fuel injection into cylinders 4, 5, and 6 is shut down, cylinders 1, 2 and 3, which are still firing, must accordingly convert or burn more than 90 mg of fuel/work cycle. The firing cylinders must compensate for the work not being performed by the non-firing cylinders and for the losses thereof through decompression via the braking cam.

In the case of most heating strategies, efficiency is achieved through a deterioration in charge exchange (e.g. exhaust gas backpressure plate, intake throttle valve etc.), resulting in a reduced mass flow.

Through the use of the "in-engine heating mode" according to the invention, the exhaust gas mass flow is hardly reduced, if at all, by virtue of the principle involved. The exhaust gas enthalpy results in a higher energy input to the exhaust gas aftertreatment system and, as a result, to more rapid warm-up.

The operating method according to the invention comprises, as it were, two degrees of freedom, namely shutting down fuel injection into at least one of the cylinders and putting the at least one shut-down cylinder into a braking mode. These two degrees of freedom allow control of the temperature of the exhaust gas for the exhaust gas aftertreatment system.

Figure 2:
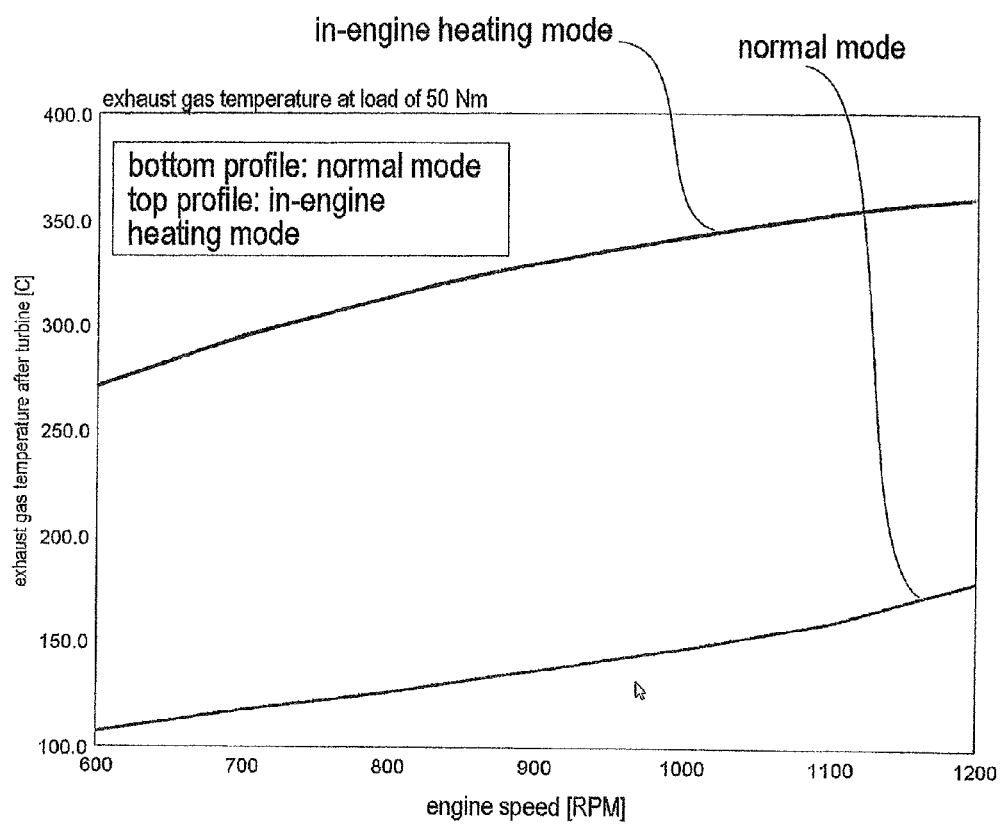
FIG. 2 is a graph simulated temperature profiles of the exhaust gas for an exhaust gas aftertreatment system downstream of a turbine of a turbocharger in a normal mode and in an in-engine heating mode according to one embodiment of the invention.

FIG. 2 shows simulated temperature profiles of the temperatures of the exhaust gas for an exhaust gas aftertreatment system downstream of a turbine of a turbocharger.

The simulated temperature profiles illustrated show the exhaust gas temperatures after the turbine of the turbocharger against engine speed at a load of 50 Nm in the normal mode (at the bottom) and in the in-engine heating mode according to the invention (at the top) in the case of a 6-cylinder internal combustion engine.

If 3 cylinders are shut down and braked and 3 cylinders are firing, as in this calculation, the exhaust gas temperature level can be shifted into the temperature window shown.

Figure 3:
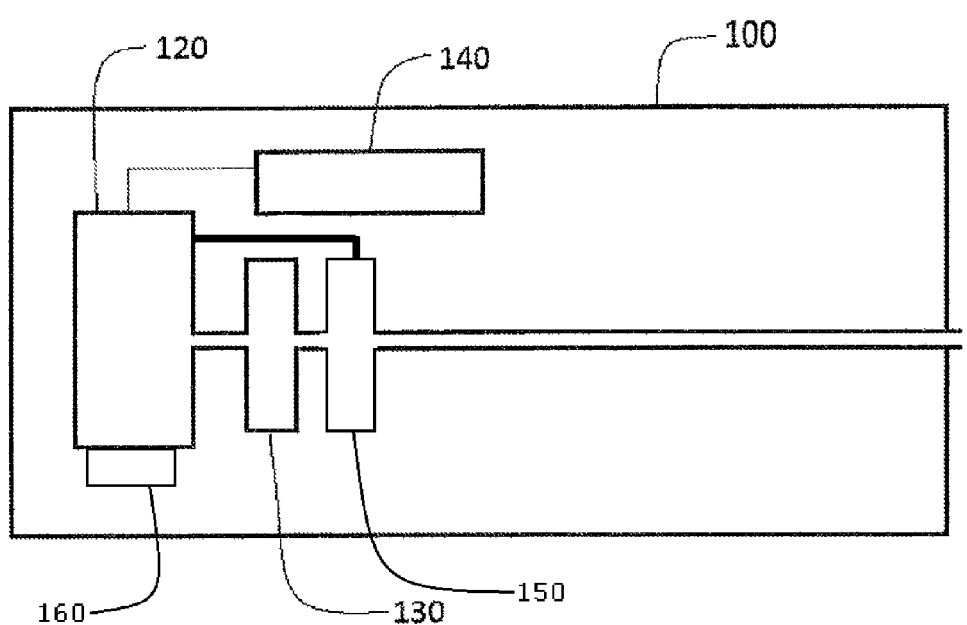
FIG. 3 is a vehicle.

FIG. 3 is a motor vehicle 100, preferably configured as a commercial vehicle. The motor vehicle 100 has an internal combustion engine 120, which has a crankshaft and a plurality of cylinders, an exhaust gas aftertreatment system 130, and a control system 140. Also shown is an exhaust gas turbocharger 150. The control system 140 is configured to: shut down fuel injection into at least one of the plurality of cylinders when required; and put the at least one shut-down cylinder into a braking mode, wherein an exhaust gas temperature of the exhaust gas aftertreatment system is increased. Also shown is a cam contour device 160 that at least one of shuts down the fuel injection into the at least one of the cylinders and puts the at least one shut-down cylinder into a braking mode. The cam contour device 160 can have one or more cams, which can be arranged on a same shaft or separate shafts.

The invention is not restricted to the preferred embodiments described above. On the contrary, a large number of variants and modifications that likewise make use of the inventive concept and therefore fall within the scope of protection is possible. Moreover, the invention also claims protection for the subject matter and features of the dependent claims, independently of the features and claims to which they refer.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An operating method for a device having an internal combustion engine having a crankshaft and a plurality of cylinders, an electronic controller, and an exhaust gas aftertreatment system, comprising:
   shutting down fuel injection into at least one of the plurality of cylinders when required; and
   putting the at least one shut-down cylinder into a braking mode,
   wherein an exhaust gas temperature for the exhaust gas aftertreatment system is increased,
   wherein a cam contour device accomplishes at least one of the shutting down the fuel injection into the at least one of the cylinders and putting the at least one shut-down cylinder into a braking mode.

2. The operating method according to claim 1, wherein a demanded crankshaft torque is produced by at least one firing cylinder.

3. The operating method according to claim 2,
   wherein the at least one cylinder that has been put into the braking mode performs negative work, and
   wherein the at least one firing cylinder compensates for the negative work.

4. The operating method according to claim 1, wherein control of the exhaust gas temperature for the exhaust gas aftertreatment system is accomplished by shutting down the at least one cylinder.

5. The operating method according to claim 1, wherein control of the exhaust gas temperature for the exhaust gas aftertreatment system is accomplished by putting the at least one shut-down cylinder into the braking mode.

6. The operating method according to claim 1, wherein the operating method represents an in-engine heating mode for exhaust gas for the exhaust gas aftertreatment system.

7. The operating method according to claim 1, wherein the device has an exhaust turbocharger.

8. The operating method according to claim 1, wherein the exhaust gas aftertreatment system has at least one of a diesel oxidation catalyst, one SCR catalyst, and one diesel particulate filter.

9. The operating method according to claim 1, wherein the exhaust gas temperature of the exhaust gas aftertreatment system is increased in comparison with a normal mode.

10. The operating method according to claim 9, wherein the exhaust gas temperature of the exhaust gas aftertreatment system downstream of a turbine of a turbocharger is increased in comparison with the normal mode.

11. A motor vehicle, comprising:
    an internal combustion engine having a crankshaft and a plurality of cylinders;
    an exhaust gas aftertreatment system; and
    a control system configured to:
        shut down fuel injection into at least one of the plurality of cylinders when required; and
        put the at least one shut-down cylinder into a braking mode,
    wherein an exhaust gas temperature for the exhaust gas aftertreatment system is increased,
        wherein a cam contour device accomplishes at least one of the shutting down the fuel injection into the at least one of the cylinders and putting the at least one shut-down cylinder into a braking mode.

12. The motor vehicle of claim 11, wherein the motor vehicle is a commercial vehicle.

13. The motor vehicle of claim 11, wherein the cam contour device can have one or more cams.

14. The motor vehicle of claim 13, wherein each cam of the cam contour is arranged on one of a same shaft and a respective shaft.

* * * * *